(12) United States Patent
Schumacher et al.

(10) Patent No.: US 7,490,906 B2
(45) Date of Patent: Feb. 17, 2009

(54) SEAT BACKREST FOR THE CREW REST COMPARTMENT OF AN AIRCRAFT

(75) Inventors: Markus Schumacher, Buxtehude (DE); Andrew Muin, Harsefeld (DE)

(73) Assignee: Airbus Deutschland GmbH (DE)

( * ) Notice: Subject to any disclaimer, the term of this patent is extended or adjusted under 35 U.S.C. 154(b) by 369 days.

(21) Appl. No.: 11/135,129

(22) Filed: May 23, 2005

(65) Prior Publication Data

US 2005/0264058 A1 Dec. 1, 2005

Related U.S. Application Data

(60) Provisional application No. 60/598,267, filed on Aug. 3, 2004.

(30) Foreign Application Priority Data

May 27, 2004 (DE) .................. 10 2004 025 980

(51) Int. Cl.
*B60N 2/02* (2006.01)
*B60N 2/46* (2006.01)

(52) U.S. Cl. .................. 297/353; 297/383; 297/411.32; 296/65.01; 296/65.16

(58) Field of Classification Search .................. 297/14, 297/411.32, 383, 183.5, 411.33, 411.39, 297/411.21, 353; 296/65.01, 65.16, 66; 248/503, 503.1; 5/37.1, 47; 244/118.6
See application file for complete search history.

(56) References Cited

U.S. PATENT DOCUMENTS

| | | | | |
|---|---|---|---|---|
| 1,968,232 A | * | 7/1934 | Thomas ...................... 297/353 |
| 2,492,430 A | * | 12/1949 | Koch .............................. 5/634 |
| 2,497,412 A | * | 2/1950 | Larin .......................... 297/14 |
| 2,554,799 A | * | 5/1951 | Sprunger ........................ 5/632 |
| 2,556,077 A | * | 6/1951 | Fetterly et al. .................. 5/9.1 |
| 2,583,372 A | * | 1/1952 | Hall ............................. 297/14 |
| 2,650,370 A | * | 9/1953 | Cudini ........................... 5/9.1 |
| 2,652,572 A | * | 9/1953 | Hopeman, Jr. et al. ........... 5/9.1 |
| 3,178,733 A | * | 4/1965 | Wachsman ..................... 5/632 |
| 3,594,037 A | * | 7/1971 | Sherman ...................... 297/14 |
| 3,886,611 A | * | 6/1975 | Lammy et al. ............... 114/363 |
| 4,141,093 A | * | 2/1979 | Marsden ........................ 5/9.1 |
| 4,460,215 A | * | 7/1984 | Chamberlain et al. ......... 297/14 |

(Continued)

FOREIGN PATENT DOCUMENTS

DE 3822574 C2 1/1991

(Continued)

*Primary Examiner*—David Dunn
*Assistant Examiner*—Tania Abraham
(74) *Attorney, Agent, or Firm*—Lerner, David, Littenberg, Krumholz & Meatlik, LLP

(57) ABSTRACT

To save space it is often not possible to provide a comfortable seat beside a bed, for example for a second flightdeck crew. Normally, sitting on a bed is not comfortable for extended periods of time. The present invention states a backrest arrangement which can be changed from a foldaway position to a seating position. The backrest arrangement can be hinged to a wall. In foldaway position, the distance between a lower region of the backrest and the essentially vertical surface is shorter than in the seating position. In this way the backrest arrangement can for example be attached to a wall beside a bed; in the seating position the backrest arrangement provides a comfortable and safe seat.

8 Claims, 2 Drawing Sheets

U.S. PATENT DOCUMENTS

| | | | |
|---|---|---|---|
| 4,628,552 A * | 12/1986 | Magistretti | 5/52 |
| 4,902,069 A | 2/1990 | Lehnert | |
| 4,913,487 A * | 4/1990 | Breckel et al. | 297/14 |
| 4,993,666 A * | 2/1991 | Baymak et al. | 244/122 R |
| 5,171,063 A * | 12/1992 | Stidd | 297/344.1 |
| 5,498,052 A * | 3/1996 | Severini et al. | 296/65.09 |
| 5,564,780 A * | 10/1996 | Presser et al. | 297/238 |
| 5,567,016 A * | 10/1996 | Koprowski | 297/411.32 |
| 6,089,651 A * | 7/2000 | Carmen | 297/16.1 |
| 6,637,045 B1 * | 10/2003 | Larsen | 4/496 |
| 6,695,378 B2 * | 2/2004 | Hanagan | 296/65.01 |
| 6,896,322 B1 * | 5/2005 | Foy | 297/14 |

FOREIGN PATENT DOCUMENTS

| | | |
|---|---|---|
| DE | 19742773 | 4/1999 |
| WO | WO-02/06117 A1 | 1/2002 |

* cited by examiner

SEAT BACKREST FOR THE CREW REST COMPARTMENT OF AN AIRCRAFT

CROSS-REFERENCE TO RELATED APPLICATIONS

This application claims the benefit of the filing date of German Patent No. 10 2004 025 980.1, filed May 27, 2004 and U.S. Provisional Patent Application No. 60/598,267 filed Aug. 3, 2004, the disclosures of which are hereby incorporated herein by reference.

BACKGROUND OF THE INVENTION

The present invention relates to a backrest arrangement for a seat in an aircraft.

The increased range of aircraft, for example of the Airbus A 380, makes it necessary to have a second flightdeck crew on board. For this purpose it is possible, for example, in a region between the entry that is furthest forward and the flight deck to provide for two pilot rests, arranged so as to be staggered, one above the other, in which the flightdeck crew that is off duty at the time can rest.

A layout of compartments that are arranged one on top of the other may for example leave only a small passageway beside the beds so as to save space. Usually such passageways are just wide enough to allow a user to stand beside the bed. However, there is not enough space in this narrow passageway for a comfortable passenger seat, for example a business-class seat, so that a user can only rest lying down and has no space to do any work.

If a user wants to sit down, he/she can do so only on the bed, with the seated person having to sit across the longitudinal axis of the bed, placing his/her legs in the passageway beside the bed.

There is one difficulty in that a bed width of approximately 760 mm, which is regarded to be necessary for comfortable lying down, is not compatible with a seat depth of approximately 400 to 430 mm that is anatomically dictated by the thighs. Consequently, sitting on the edge of a bed that laterally rests against a wall does not provide any support to the back. For, if the person seated leans back, then his/her head and shoulder region reaches the supporting wall only in a position when almost lying down. This "lazy party position" is, however, not suitable for any writing or reading activities, for example by a pilot who is preparing, or following up, his/her duty.

SUMMARY OF THE INVENTION

There may be a need to provide for a device which makes it possible to sit comfortably on a bed.

According to an exemplary embodiment of the present invention, a backrest arrangement for a seat in an aircraft is provided, with the arrangement comprising a backrest. The backrest arrangement can be changed from a foldaway position to a seating position. In the foldaway position, the distance between at least one lower region of the backrest and an essentially vertical surface, on which the backrest arrangement can be arranged, is shorter than it is in the seating position.

In other words, the backrest can be folded away from an essentially vertical surface, for example a wall, so that at least a lower region of the backrest is spaced apart from the essentially vertical surface. If the backrest is in the foldaway position, then the backrest arrangement is essentially hinged to the essentially vertical surface, and advantageously takes up correspondingly little room.

For example, this backrest arrangement can be arranged on a bed or in conjunction with a bed whose side has been placed against a wall. When this backrest arrangement is affixed to the wall, with the backrest arrangement in the foldaway position, a user can sleep on the bed and can use the entire width of the bed. However, when the backrest arrangement is brought to the seating position, the user has a backrest which is arranged closer to the edge of the bed than is the essentially vertical surface. Consequently the seat depth is reduced, so that the user can sit comfortably.

In particular in a crew-rest compartment of an aircraft, a comfortable seating arrangement for working can be provided in this way, although only a narrow passageway for access to a bed is provided.

According to a further exemplary embodiment of the present invention, the backrest arrangement comprises at least one armrest, which in the foldaway position is arranged so as to be essentially vertical, i.e. essentially resting against the essentially vertical surface. However, in the seating position the armrest can be horizontally arranged such that the user can comfortably place an arm on the armrest.

In this way a backrest arrangement can be stated which due to the foldout armrest makes it possible for a user to work comfortably in the seating position. Especially in an aircraft such an armrest can additionally have a support function, for example when some turbulence is encountered during a flight.

According to a further exemplary embodiment of the present invention, the armrest, of which there is at least one, and the backrest are arranged on an essentially horizontal axis. This horizontal axis can be hinged on a second essentially horizontal axis. In this way, simple hingeing of the backrest arrangement to the essentially vertical surface can be ensured.

According to a further exemplary embodiment of the present invention, at least one distance rod is provided between the first axis and the second axis. For example, by means of this distance rod, a distance can be set between the essentially vertical surface and a region of the backrest in the seating position. In the foldaway position the distance rod is arranged so as to be essentially vertical. In the seating position the distance rod is arranged so as to be essentially horizontal and define the distance between the axis on which the backrest is arranged and the essentially horizontal surface. Furthermore, the backrest can be rotatable on the first axis so that the inclination of the backrest can be adjusted, allowing, for example, a user to easily adjust the inclination of the backrest to his or her requirements.

According to a further exemplary embodiment of the present invention, the distance rod, of which there is at least one, is an extension of the armrest. In this way a simple and effective arrangement can be provided which requires few moving parts and which is of a simple design. Moreover, this arrangement provides a lightweight backrest arrangement.

According to a further exemplary embodiment of the present invention, at least one armrest is nonrotatably arranged on the first axis. In this way, for example, a type of automatic function of the armrest can be provided to the effect that when the backrest is folded down from the foldaway position to the seating position, the armrest automatically moves to the horizontal position.

According to a further exemplary embodiment of the present invention, in its head region, the backrest is attachable to the essentially vertical surface. This embodiment is of a particularly simple design. For example, only the head region can be attached to the essentially vertical surface. In order to move the backrest, and thus the backrest arrangement, into the seating position it may be adequate to pull the backrest away from the essentially vertical surface, i.e. in a lower region thereof to pull it away from the essentially vertical surface, and to tilt the backrest, or to lock it into the desired position by means of a respective device. For example, this locking into position can be set by means of distance elements in relation to the vertical surface.

According to a further exemplary embodiment of the present invention, a support structure is provided which can be attached to the essentially vertical surface by means of an attachment element. The backrest is attached to the support structure. The support structure can essentially be in the shape of a square frame, wherein an upper brace and a lower brace of this frame are for example axes. According to one embodiment, the upper axis can be connected, by means of a parallelogram-shaped attachment element, to the essentially vertical surface, wherein the attachment element can be attached to the essentially horizontal surface so as to be hingeable on an essentially horizontal axis. According to this embodiment, the support structure can be hinged to the essentially vertical surface on the rotational axis of the attachment element. When the backrest arrangement is hinged from the foldaway position to the seating position, the upper axis of the frame describes a line in the shape of a quarter circle. The dimension of the attachment element between the two axes, namely between the attachment axis of the attachment element and the upper axis of the frame, determines the distance between a region of the backrest and the essentially vertical surface.

According to a further exemplary embodiment of the present invention, a seat element is connected to the lower axis of the frame. By hingeing the support structure to the essentially vertical surface, the seat element is hinged to the backrest.

For example, the seat element can comprise contours, for example in order to provide an anatomical seat. The backrest arrangement according to this embodiment can for example be used as an additional folding seat for areas in an aircraft where an emergency seat is required which in the foldaway position only takes up little room.

According to a further exemplary embodiment of the present invention, a middle region of the seat element is rotatably attached to the lower axis of the frame. In this way, when the backrest arrangement is hinged to the essentially vertical surface, the seat element automatically hinges to the backrest because the region arranged between the support structure and the essentially vertical surface is supported by the essentially vertical surface. If the support structure then carries out the hingeing movement on the attachment axis of the attachment element, the seat element is folded to the backrest.

According to a further exemplary embodiment of the present invention, the backrest arrangement can be arranged on a wall beside a bed in such a way that in the foldaway position it is essentially not the entire width of the bed that is usable, and in the seating position the distance between the edge of the bed and the backrest is reduced to the width of one seat. The surface of the bed provides the seat surface. In this way, for example, in a crew-rest compartment a comfortable workplace can be provided beside a bed, for example a workplace for a pilot, although there is only a narrow passageway beside the bed.

A further embodiment of the invention is provided in claim 8.

BRIEF DESCRIPTION OF THE DRAWINGS

Below, advantageous embodiments of the present invention are described with reference to the following figures.

DETAILED DESCRIPTION

In the following description of FIGS. 1 to 5, identical reference numbers are used for identical or corresponding elements.

Figure 1:
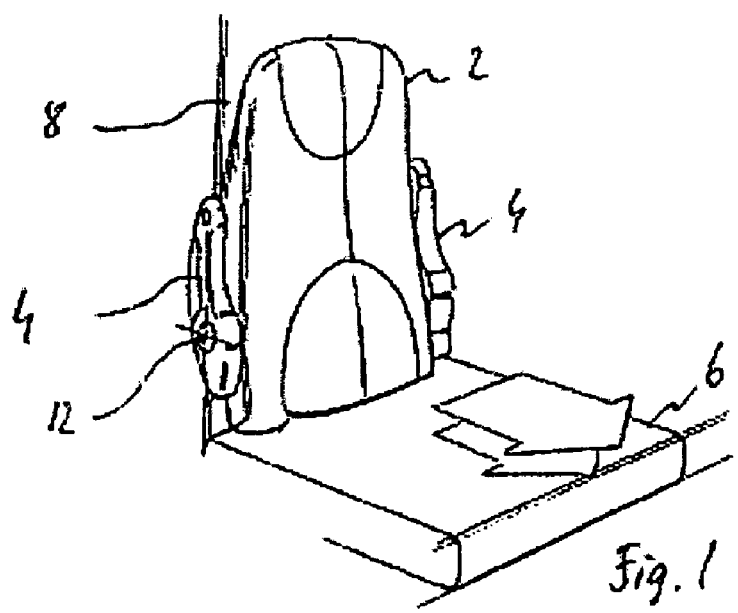
FIG. 1 shows a diagrammatic three-dimensional view of an embodiment of a backrest arrangement according to the present invention, in the foldaway position.

FIG. 1 shows a simplified diagrammatic three-dimensional view of an embodiment of a backrest arrangement according to the present invention. The reference number 2 in FIG. 1 designates a backrest whose dimensions essentially correspond to the dimensions of an average back of a user. The reference number 4 designates armrests which are attached to the backrest so as to be rotatable on an axis 12. In the foldaway position shown in FIG. 1, the backrest 2 rests against an essentially vertical surface, namely a wall 8. In this way the backrest arrangement takes up only little stowage space.

The reference number 6 designates a region of a bed. Usually the mattress of the bed is provided in region 6. As can be seen in FIG. 1, in the foldaway position the armrests 4 are essentially hinged to the wall. In the embodiment shown in FIGS. 1 to 3, armrests 4 are provided on both sides of the backrest 2.

Figure 2:
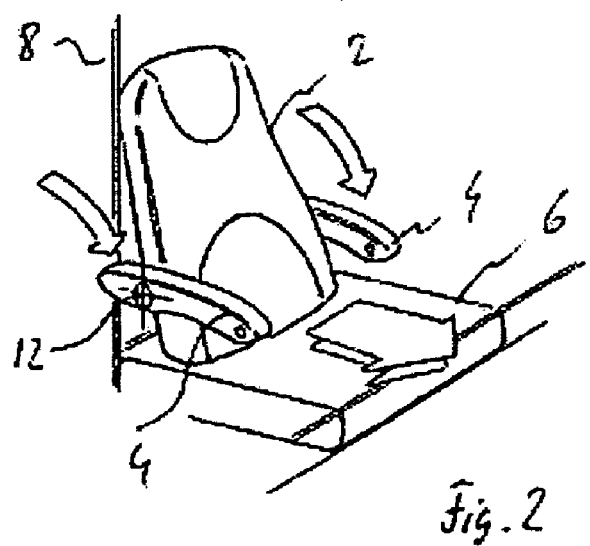
FIG. 2 shows the backrest arrangement of FIG. 1, in the seating position.

FIG. 2 shows the backrest arrangement of FIG. 1 in the seating position. As is shown in FIG. 2, a lower region of the backrest 2 is arranged at some distance from the wall 8. As a result of this, the distance between the lower end of the backrest 2 and the edge of the bed 6 is considerably reduced when compared to that of FIG. 1. Usually, the width of the bed is approximately 760 mm, which is considered the minimum width required for comfortable lying down. The backrest in FIG. 2 is essentially spaced apart from the wall 8 such that a distance of approximately 400 to 430 mm remains between the edge of the bed or the edge of the mattress and the lower end region of the backrest 2. This distance normally corresponds to the seat depth which is anatomically dictated by the length of the thighs.

Figure 3:
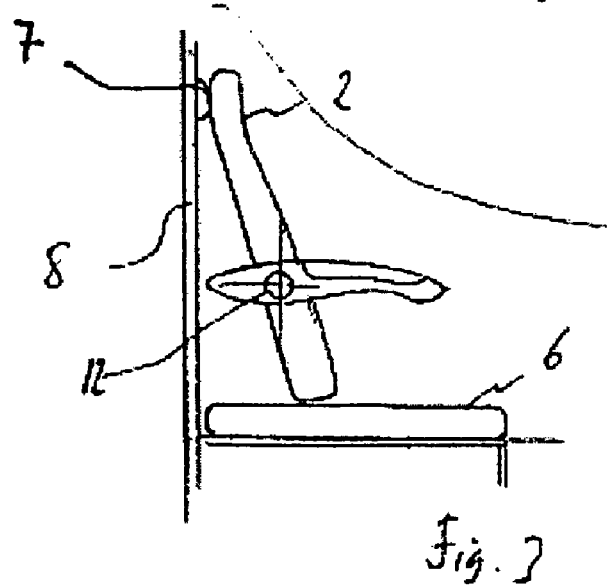
FIG. 3 shows a lateral view of the backrest arrangement of FIG. 2.

FIG. 3 shows a lateral view of the backrest arrangement in the seating position of FIG. 2. As is shown in FIG. 3, a head region of the backrest arrangement 2 is attached to the wall 8 by means of an attachment device 7. The attachment device 7 can for example allow slight horizontal displacement of the head region of the backrest 2. In particular, FIG. 3 shows that the lower end of the backrest 2 is considerably spaced apart from the wall 8, which results in a comfortable seating depth between the edge of the mattress, or the bed 6, and the seatback 2. The arrows in FIGS. 1 and 2 indicate the function of the embodiment. At first the lower region of the backrest 2 is folded away from the wall. Either independently of this, or coupled with this, the armrests 4 can then be folded out into the essentially horizontal position. If the bed is to be used for lying down, the backrest arrangement of this embodiment is hinged to the wall 8. In this way, a user can use the entire width of the bed 6. To attain a sitting position, the user only needs to pull the backrest 2 towards himself/herself, and if required, fold down the armrests.

Figure 4:
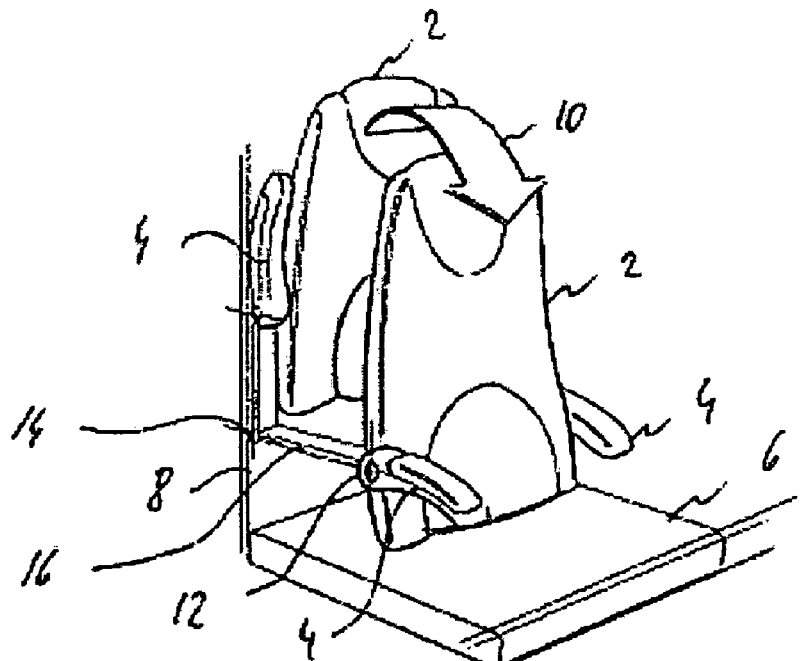
FIG. 4 shows a diagrammatic three-dimensional functional view of a further embodiment of a backrest arrangement according to the present invention.

FIG. 4 shows a three-dimensional view which diagrammatically shows the operation of a backrest arrangement according to a further embodiment of the present invention. In this embodiment, armrests 4 are provided on both sides of the seat. The backrest arrangement, comprising the backrest 2 and the armrests 4, is connected to the wall 18 by means of distance rods 16. In the embodiment shown in FIG. 4, two distance rods 16 are provided. Each of the two distance rods 16 is attached to the wall 8 by means of a joint. The joints of the distance rods 16 for attachment to the wall 8 are designed such that the distance rods 16 are rotatable on a common axis 14, which is essentially horizontal, approximately in the plane of the wall 8. This centre of rotation can also be located in an outward bulge of the wall. The backrest is attached to the distance rods 16 by means of a further essentially horizontal axis 12. The armrests 4 are nonrotatably attached to the axis 12. However, it should be pointed out that the armrests 4 can also be attached to the backrest 2 in a separate rotational axis or in separate rotational axes. To this effect, separate rotary joints can be provided.

In the embodiment shown in FIG. 4, the distance rods 16 are essentially extensions of the armrests beyond the axis 12.

In FIG. 4 the function of the backrest arrangement of this embodiment is indicated by means of the arrow 10. In the foldaway position the distance rods 16 and the armrests 4 point essentially vertically upward, i.e. they are folded to the wall 8. Likewise, the backrest 2 is hinged to the wall. According to this particularly advantageous embodiment of the present invention, there is some distance between the rotational axis 14 of the distance rods 16 on the wall 8 and the upper edge of the mattress of the bed 6. This distance ensures that, since the backrest can have a certain width, it is still possible for the user to use the entire width of the bed because in its foldaway position the backrest arrangement is hinged to the wall approximately 30 or 35 cm above the upper edge of the mattress of the bed 6. When the backrest arrangement is hinged to the seating position, the armrests 4 and the distance rods 16 are hinged by their joints by approximately 90° in relation to the rotational axis 14 until the armrests 4 and/or the distance rods 16 are arranged so as to be essentially horizontal. In this way a space between the edge of the bed 6 (or the mattress) and the backrest 2 is set such that a comfortable seating position becomes possible. The resulting seat length can be adjusted by the length of the distance rods 16.

In one variant of this embodiment the armrests 4 can be hinged on the rotational axis 12.

Figure 5:
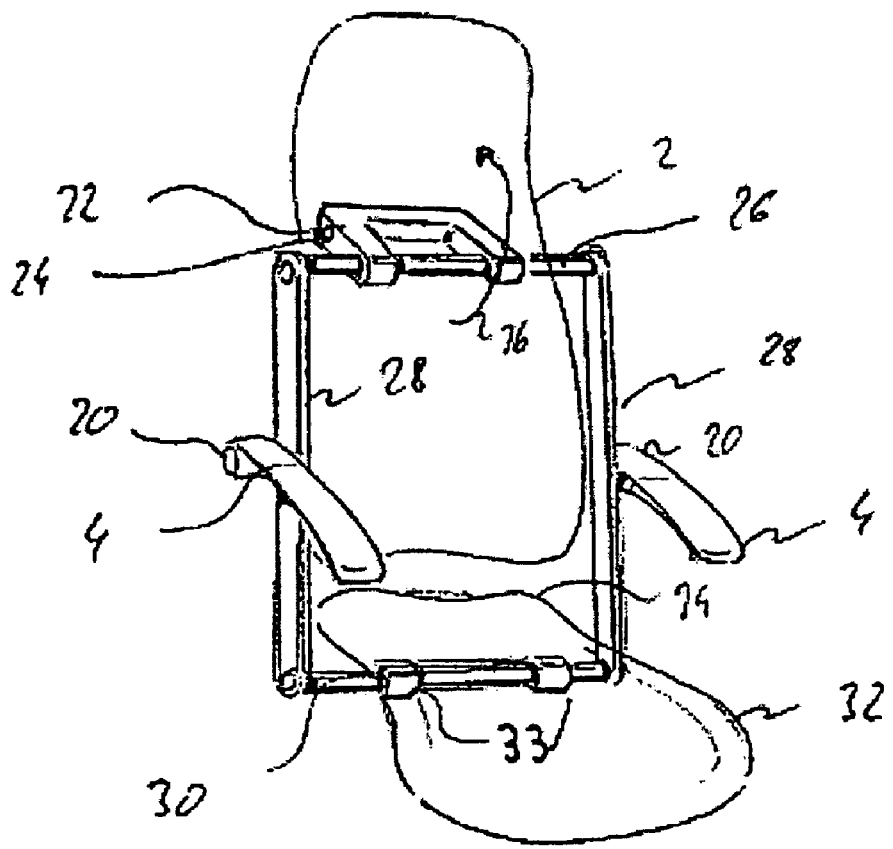
FIG. 5 shows a further diagrammatic three-dimensional view of a further embodiment of a backrest arrangement according to the present invention.

FIG. 5 shows a three-dimensional diagrammatic view of a backrest arrangement according to a further embodiment of the present invention.

Reference number 22 in FIG. 5 designates an attachment element. This attachment element is hingeably attached to a wall in such a way that it is hingeable on an axis 24 which is arranged so as to be essentially horizontal in the plane of the wall 8. However, the rotational axis 24 can also be arranged in a recess of the wall, i.e. spaced apart from the wall. The other end of the attachment element 22, which is not attached to the wall, is hingeably connected to a support structure. In particular, the attachment element 22 is hingeably connected to the support structure in such a way that the support structure is essentially hingeable on an axis 26. The support structure comprises the axis 26, a further axis 30, which is parallel to said axis 26, as well as two lateral members 28, which are also arranged so as to be essentially parallel in relation to each other, so that an essentially rectangular frame structure is formed. The backrest 2 is provided on said frame structure. Furthermore, the lateral members 28 comprise armrests 4, which have been attached to the lateral members 28 by means of rotary joints 20. A seat element 32 is provided on the axis 30 by means of joints 33. A rear end 34 of the seat element 32, which is shown in the seating position in FIG. 5, is supported by the wall. In this way a position of the seat element 32 relative to the wall is determined by means of the dimension from the rotational axis 30 to the end 34 of the seat element 32.

Essentially, the function of the embodiment shown in FIG. 5 resembles that of a parallelogram. If the backrest arrangement is moved from the seating position shown in FIG. 5 to the foldaway position, the attachment element (shown by the arrow 36 in FIG. 5) is hinged upward on the rotational axis 24. As a result of this, the frame structure is hinged to the wall. Since the rear end 34 of the seat element 32 is supported by the wall, or can be attached to the wall, as a result of the upward rotary movement of the frame structure, the seat element 32 on the axis 30 is hinged to the backrest 2, which results in a very space-saving foldaway position.

Apart from the arrangement of this embodiment in conjunction with a bed, where as a result of the seat element protruding, soiling of the bed linen can be avoided and/or an anatomically supportive seating position can be provided, the backrest arrangement according to this embodiment can also be used as an emergency seat for various areas in an aircraft.

Advantageously, all the above-described embodiments may make possible a design of the backrest 2 in the shape of a rocker which passively adapts to the respective posture of the seated user, without said backrest 2 lacking the necessary back support. In particular in the embodiment shown in FIG. 4, for example, by pushing against the upper region, a lower region of the backrest which provides lumbar support to the user can be moved closer.

Any change in the posture of the seated person is initiated without the user being particularly aware of this, for example by the user sliding forward or backward on the bed surface or on the seat element 32. Once the desired position is found, this results automatically in a desired seating posture that is more reclined or more upright if the seated person pushes his/her back against the backrest.

Instead of providing only one seat according to the invention or backrest arrangement according to the invention in conjunction with a bed, depending on the length of the bed and the width of the backrest arrangement, several backrest arrangements according to the invention can be provided along a bed so that several seats can be provided along the available length of the bed. Furthermore, the attachment points of the backrest arrangements according to the invention can for example be horizontally slidable along the wall, for example so as to be seated more closely towards the head end or foot end of the bed. Furthermore, these attachment points can be horizontally slidable so that it becomes possible to set a distance between the backrest or the attachment points and the top of the mattress of the bed 6. Furthermore, on a vertical surface below the edge of the bed a height-adjustable footrest can be hinged out if the height of the bed surface above the floor of the passageway does not conform to the anatomical requirements. For example, the footrest can be coupled to the rotational axis 12 of the backrest (FIG. 4) by means of a rod. Moreover, it is possible, for example in the embodiment shown in FIG. 4, to design the length of the distance rods 16 to be adjustable so as to obtain an adjustable seat width. It is also possible to implement a cam-type adjustment mechanism for the backrest hingeing axis, or to implement telescopic longitudinal adjustment of the distance rods 16.

The hingeing axis of the backrest can comprise a spring-return for returning the backrest to the foldaway position. Furthermore, electrically controllable rotation or activation of the corresponding rotational axes is possible, so that a position preferred by a user can automatically be set, for example by means of a memory function. Such a memory function can for example be provided for the distance between the backrest and the wall, and thus for the seat depth for various users.

In addition it should be pointed out that "comprising" does not exclude other elements or steps; and that "one" does not exclude a multiple number. Furthermore, it should be pointed out that features or steps described with reference to one of the above embodiments can also be used in combination with other features or steps of other embodiments described above. Any reference characters in the claims should not be interpreted in a restricting or limiting sense.

The invention claimed is:

1. A backrest arrangement for a seat in an aircraft, comprising:
    a backrest; and
    at least one armrest;
    wherein the backrest arrangement is changeable from a foldaway position to a seating position;
    wherein the backrest is arrangeable on an essentially vertical surface;
    wherein in the foldaway position, a distance between at least one lower region of the backrest and the essentially vertical surface is shorter than it is in the seating position;
    wherein a first axis is pivotable around a second axis, which is essentially horizontal;
    wherein at least one distance rod is provided between the first axis and the second axis;
    wherein the at least one distance rod is an extension of the at least one armrest; and
    wherein the distance rod sets a distance between the essentially vertical surface and the at least one lower region of the backrest in the seating position; and
    wherein the backrest is rotatably connected only to the at least one distance rod by means of the first axis such that the backrest is arrangeable in the seating position such as to be vertical.

2. The backrest arrangement of claim 1,
    wherein the at least one armrest, is arrangeable, in the foldaway position so as to be essentially vertical; and
    wherein the at least one armrest, is arrangeable essentially horizontally in the seating position such that an armrest function can be provided.

3. The backrest arrangement of claim 2,
    wherein the at least one armrest and the backrest are arranged on an essentially horizontal first axis.

4. The backrest arrangement of claim 3,
    wherein the backrest, can be folded to the essentially vertical surface in the foldaway position by rotating the at least one distance rod on the second axis.

5. The backrest arrangement of claim 4,
    wherein an armrest is provided on each side of the backrest.

6. The backrest arrangement of claim 1,
    wherein the armrest, of which there is at least one, is nonrotatably arranged on the first axis.

7. The backrest arrangement of claim 1,
    wherein the backrest arrangement can be arranged on a wall beside a bed such that in the foldaway position essentially the entire width of the bed is usable, and in the seating position the distance between the edge of the bed and the backrest is reduced to the width of one seat, and
    wherein the surface of the bed provides a seat.

8. The backrest arrangement of claim 1,
    wherein the backrest arrangement is designed for providing a seat on a bed in a crew-rest compartment of an aircraft.

\* \* \* \* \*